United States Patent
Kollarapu et al.

(10) Patent No.: US 12,537,820 B2
(45) Date of Patent: Jan. 27, 2026

(54) SYSTEMS AND METHODS FOR REMOTELY MANAGING DEVICES USING OUT-OF-BAND COMPONENTS

(71) Applicant: Dell Products L.P., Round Rock, TX (US)

(72) Inventors: Rajaravi Chandra Kollarapu, Allen, TX (US); Abeye Teshome, Austin, TX (US); Mohit Arora, Frisco, TX (US); Richard M. Tonry, Georgetown, TX (US); Luis Antonio Valencia Reyes, Waxahachie, TX (US); Bassem El-Azzami, Austin, TX (US); Vinodkumar Vasudev Ottar, McKinney, TX (US); Adolfo Sandor Montero, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 141 days.

(21) Appl. No.: 18/649,117

(22) Filed: Apr. 29, 2024

(65) Prior Publication Data
US 2025/0337741 A1    Oct. 30, 2025

(51) Int. Cl.
*H04L 29/06* (2006.01)
*H04L 9/40* (2022.01)

(52) U.S. Cl.
CPC .............. *H04L 63/10* (2013.01); *H04L 63/06* (2013.01)

(58) Field of Classification Search
CPC ..... H04L 63/10; H04L 63/06; H04L 63/0263; H04L 63/16; G06F 21/606; G06F 21/30
See application file for complete search history.

(56) References Cited

U.S. PATENT DOCUMENTS

| | | | |
|---|---|---|---|
| 8,042,182 B2 | 10/2011 | Milani Comparetti et al. | |
| 8,615,785 B2 | 12/2013 | Elrod et al. | |
| 8,924,620 B2 | 12/2014 | Harriman et al. | |
| 9,215,244 B2 | 12/2015 | Ayyagari et al. | |
| 9,734,169 B2 | 8/2017 | Redlich et al. | |
| 10,079,880 B2 * | 9/2018 | Murphy | H04L 63/0428 |
| 10,176,308 B2 | 1/2019 | Mintz et al. | |
| 10,298,670 B2 | 5/2019 | Ben-Shael et al. | |
| 10,671,765 B2 | 6/2020 | Swierk et al. | |
| 11,036,902 B2 | 6/2021 | Nicholas | |
| 11,102,122 B2 | 8/2021 | Seed et al. | |
| 11,134,380 B2 | 9/2021 | Fox et al. | |
| 11,487,274 B2 | 11/2022 | Valder et al. | |
| 11,792,267 B2 | 10/2023 | Kreiner et al. | |

(Continued)

*Primary Examiner* — Longbit Chai
(74) *Attorney, Agent, or Firm* — WOMBLE BOND DICKINSON (US) LLP

(57) ABSTRACT

Methods and systems for managing operation of data processing systems are disclosed. To manage operations of the data processing system, a device management system may provide requests to perform management operations by the data processing system that may be obtained by out-of-band components of the data processing system via a cloud server. A determination may be made whether the management system has authority to manage the data processing system and based on authorization approval, the request to manage the data processing system may be managed by the out-of-band components of the data processing system to service the request and provide the desired computer-implemented services.

20 Claims, 6 Drawing Sheets

(56) References Cited

U.S. PATENT DOCUMENTS

| | | |
|---|---|---|
| 2011/0087387 A1 | 4/2011 | Safa-Bakhsh et al. |
| 2018/0039946 A1 | 2/2018 | Bolte et al. |
| 2020/0112555 A1* | 4/2020 | Brown ................ H04L 63/083 |
| 2021/0034048 A1 | 2/2021 | Hajizadeh |
| 2021/0073211 A1 | 3/2021 | Wright, Sr. |
| 2022/0038659 A1 | 2/2022 | Michel |

* cited by examiner

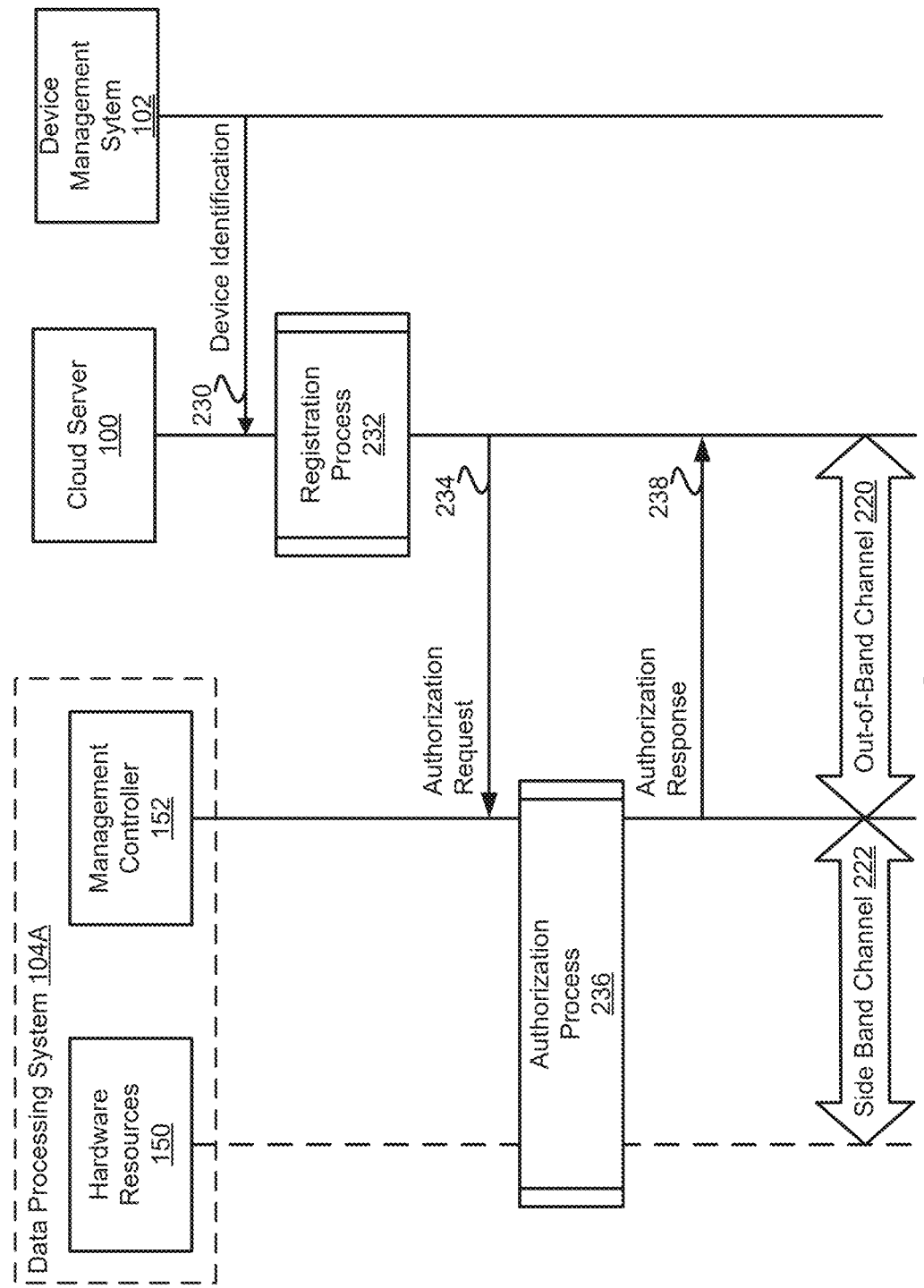

SYSTEMS AND METHODS FOR REMOTELY MANAGING DEVICES USING OUT-OF-BAND COMPONENTS

FIELD

Embodiments disclosed herein relate generally to managing operations of data processing systems. More particularly, embodiments disclosed herein relate to systems and methods to manage operations of a data processing system of the data processing systems using at least out-of-band components.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIGS. 2A-2B show interaction diagrams in accordance with an embodiment.

DETAILED DESCRIPTION

Figure 1A:
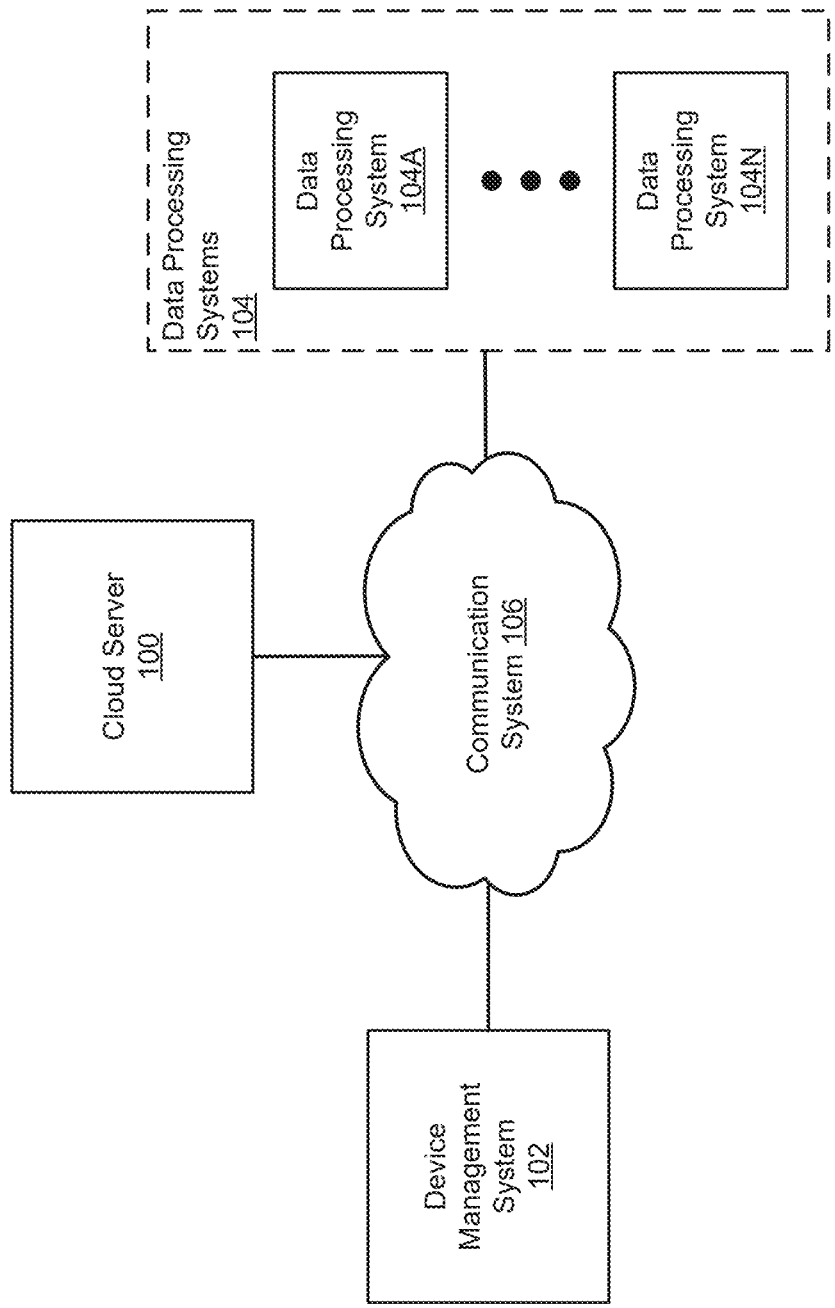
FIG. 1A shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing operation of data processing systems. The data processing systems may provide computer-implemented services to any type and number of other devices and/or users of the data processing systems. The computer-implemented services may include any quantity and type of such services.

A request to manage operation of and/or data stored by a data processing system may be initiated by an external device operated by an administrator or user of the data processing system. To receive and manage requests for the data processing system, hardware resources of the data processing system may be turned on and an operating system of the data processing system may be required to connect to a network (e.g., communication channel associated with a trusted server).

For example, the server may provide the request including instructions for managing sensitive data stored by the data processing system using in-band components connected to a network shared with the data processing system. However, providing the instructions via in-band components of the data processing system may not provide an adaptable solution in the event the hardware resources (e.g., including the in-band components) of the data processing system are not operational and/or not functional (e.g., powered off, failure of the components, etc.).

To manage data stored and/or operation of the data processing system, a remote management framework for the data processing system may be implemented that utilizes out-of-band methods (e.g., out-of-band components and/or out-of-band communication channels) to obtain, authorize, and/or otherwise manage requests for management operations of the data processing system by an external entity. By doing so, the remote management services may be implemented without utilizing an operating system of the data processing system and/or in the event that the in-band components of the data processing system are not functional (e.g., powered off, compromised, etc.). Therefore, data stored by and/or operation of the data processing system may be managed remotely by an authorized entity using a trusted server of the data processing system.

In an embodiment, a method of managing operation of a managed device by a cloud server is provided. The method may include: obtaining, from a device management system and by the cloud server, a request indicating performance of an action set by the managed device; attempting, by the cloud server and based on the request, to determine whether the device management system is authorized to manage the managed device; in a first instance of the attempting where it is determined that the device management system is authorized to manage the managed device: identifying, by the cloud server, a management controller hosted by the managed device based on the request; forwarding, by the cloud server and to the management controller and via an out-of-band communication channel, the request; receiving, by the cloud server and from the management controller and via the out-of-band communication channel and responsive to the forwarded request, a notification based at least in part on an attempt to perform the action set; and providing, by the cloud server and to the device management system, the notification to complete servicing of the request.

Identifying the management controller may include: obtaining an identifier of hardware resources of the managed device based on the request; and performing a look up using the identifier of hardware resources as a key to obtain an identifier for the management controller, wherein identifiers of management controllers of different managed devices are stored in a searchable format keyed to identifiers of hardware resources of the different managed devices.

The device management system may be unable to communicate with to the managed device, and the device management system may rely on the cloud server to bridge communications to the managed device.

During communication between the device management system and the managed device, the communication may be encrypted in a manner that prevents the cloud server from accessing the communication.

The method may also include: prior to obtaining the request: obtaining, by the cloud server and from the device management system, a request for authority to manage operation of the managed system; and performing, by the cloud server and based on the request for the authority, a registration process to attempt to register the device management system with respect to authority over the managed system.

The method may also include: receiving, by the management controller and via the out-of-band communication channel, the request; attempting, by the management controller and based on the request and using at least a sideband channel between the management controller and hardware resources of the managed device, to perform the action set; and notifying, by the management controller and via the out-of-band communication channel and based at least in part on the attempting to perform the action set, the cloud server of at least an outcome of the attempting to perform the action set.

The managed device comprises hardware resources and a network module may be adapted to separately advertise network endpoints for the management controller and the hardware resources of the managed device, the network endpoints may be usable by the cloud server to address communications to the hardware resources using an in-band communication channel and the management controller using the out-of-band communication channel.

The request may be addressed to a network endpoint of the network endpoints associated with the hardware resources via the network endpoint associated with the hardware resources.

The management controller and the network module may be on separate power domains from the hardware resources so that the management controller and the network module may be operable while the hardware resources are inoperable.

The out-of-band communication channel may run through the network module, and an in-band communication channel that services the hardware resources may also run through the network module.

The network module may host a transmission control protocol/internet protocol (TCP/IP) stack to facilitate network communications via the out-of-band communication channel.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the method when the computer instructions are executed by the processor.

Figure 1B:
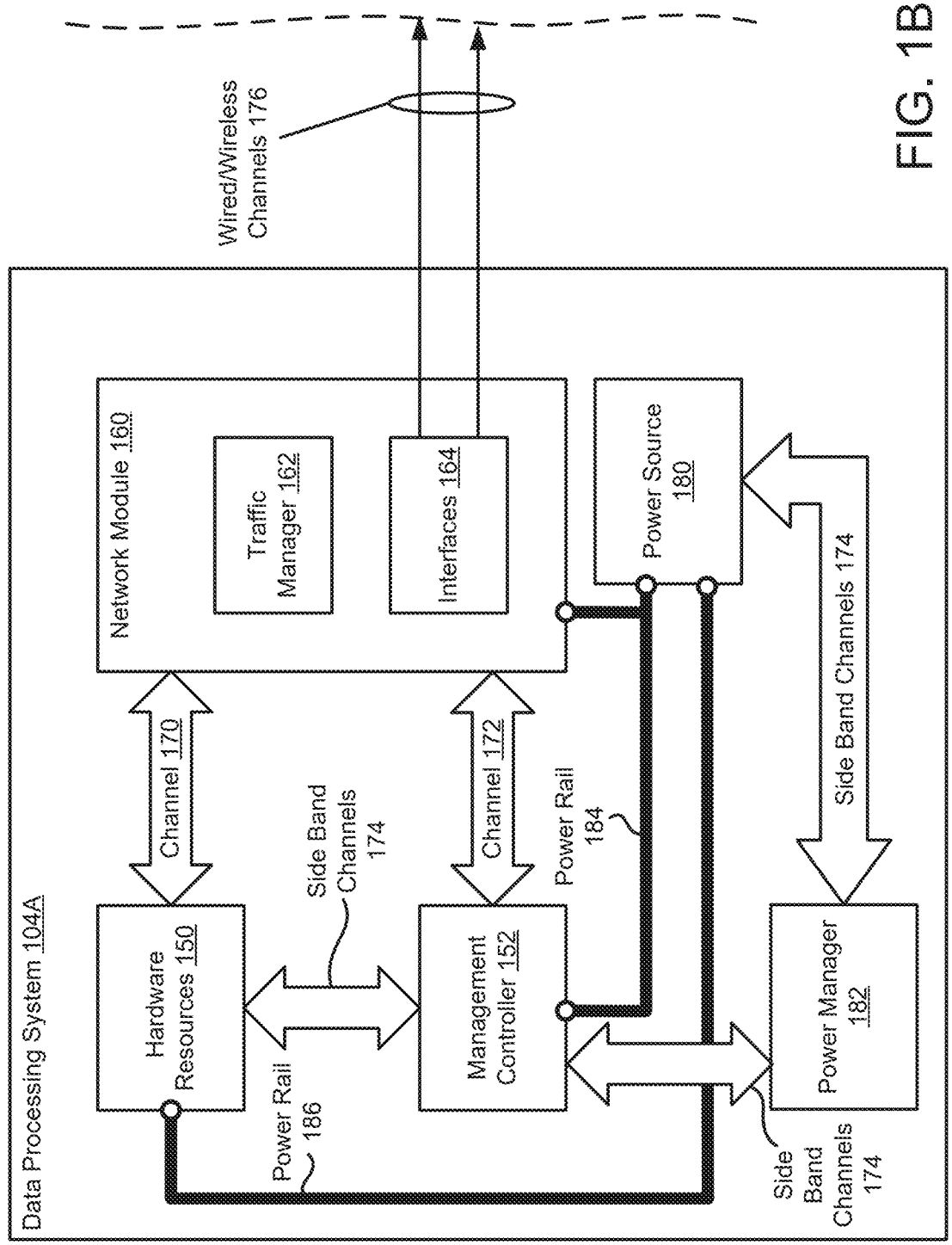
FIG. 1B shows a block diagram illustrating a data processing system in accordance with an embodiment.

Turning to FIG. 1A, a block diagram illustrating a system in accordance with an embodiment is shown. The system shown in FIG. 1A may provide for management of operations of data processing systems that may provide, at least in part, computer-implemented services. The system may include any number of data processing systems 104 (e.g., computing devices) that may each include any number of hardware components (e.g., processors, memory modules, storage devices, communications devices). The hardware components may support execution of any number and types of applications (e.g., software components). Changes in available functionalities of the hardware and/or software components may provide for various types of different computer-implemented services to be provided over time. Refer to FIG. 1B for additional details regarding data processing systems 104.

Operation of and/or computer-implemented services provided by a data processing system (e.g., data processing system 104A) may be impacted (e.g., restricted and/or limited) based on accessibility and/or functionality of the data processing system. For example, in order to perform the computer-implemented services as desired, hardware and/or software components of data processing systems 104 may need to be powered on, fully booted up, connected to a network, etc.

In some instances, data processing systems 104 may need to be remotely accessed and/or operated by a user. For example, data processing system 104A may be physically inaccessible by a user (e.g., due to physical proximity to the data processing system) and as such, may be remotely accessed by the user via remote applications hosted by an operating system of data processing system 104A. For example, the user may utilize a personal computing device and login (e.g., via inputting authorized credentials) into a remote application service and submit a request to remotely connect to and manage operations of data processing system 104A. To do so, data processing system 104A may utilize various in-band components (e.g., the hardware resources) and/or a network stack hosted by the hardware resources to obtain and implement the request for remote access. Thus, operation of and/or computer-implemented services provided by data processing systems 104 may be impacted (e.g., limited and/or restricted) based on the available functionalities of the hardware and/or software components of data processing systems 104.

For example, data processing systems 104 may not be functioning (e.g., due to failure of hardware resources, to depowering of hardware resources, etc.) and as such, may not connect to network used to establish in-band communication channels for transmitting data (e.g., receiving the request for remote access) to other devices (e.g., personal computing device used to remotely access data processing system 104A). Thus, operation of and/or computer-implemented services provided by data processing systems 104 may depend on the available functionality of the hardware and/or software components of data processing systems 104.

However, even when the hardware and/or software components of data processing systems 104 are functional, use of the in-band components and/or the network stack hosted by in-band components may place the data processing system at risk of indirect compromise. For example, if any of the in-band components of data processing systems 104 are compromised, the in-band components may compromise the operation of data processing systems 104. In addition, if various drivers and/or the network stack are compromised, communications to/from remote entities may be compromised.

Compromise and/or otherwise reduction in functionality of the hardware resources and/or software components of data processing systems 104 may prevent data processing systems 104 from receiving communications indicating desired modifications (e.g., remote access) to the operation of the data processing systems. Consequently, quality and/or availability of the computer-implemented services may be negatively impacted over time.

In general, embodiments disclosed herein may provide methods, systems, and/or devices for managing operation of a managed device (e.g., data processing system 104A) by a cloud server (e.g., cloud server 100). To manage operation of the managed device, a system in accordance with an embodiment may forward requests to out-of-band components of the managed device for performance of an action set by the managed device. To facilitate management of requests to perform action sets by the managed device, a cloud server may perform an authorization process for the requests to determine whether a requesting entity (e.g., providing the requests) is authorized to manage the managed device. Based on the determination that the requesting entity is authorized, the cloud server may identify the out-of-band components of the managed device and forward the requests to the managed device via the out-of-band components in order for the managed device to perform the action set (e.g., specified by the requests).

By doing so, embodiments disclosed herein may facilitate continued provision of desired computer-implemented services by data processing systems 104 regardless of a status of one or more in-band components (e.g., the hardware resources). By utilizing out-of-band components of a managed device, a cloud server may remotely manage the managed device based on requests received from devices that are authorized to manage the managed device. In addition, communications usable by the out-of-band components to manage the operation of data processing system 104A may not need to traverse any in-band components and, therefore, may be less likely to be compromised in the event of compromise of one or more in-band components. Doing so may increase the quality and/or availability of computer-implemented services to the user of data processing system 104A.

To provide the above noted functionality, the system of FIG. 1A may include cloud server 100, device management system 102, data processing systems 104, and communication system 106. Cloud server 100, device management system 102, data processing systems 104, and/or any other type of devices not shown in FIG. 1A may perform all, or a portion of the computer-implemented services independently and/or cooperatively. Each of these components is discussed below.

Data processing systems 104 may provide desired computer-implemented services and perform cooperative processes with cloud server 100 to establish a bridge for communications between device management system 102 and data processing systems 104. Data processing systems 104 may include in-band components (e.g., hardware resources) and out-of-band components (e.g., a management controller), and functionality that may allow the out-of-band components to (i) communicate with one another independently from the in-band components, (ii) perform operations independently from the in-band components, and/or (iii) communicate with remote systems independently from the in-band components. For more information regarding components of data processing systems 104, refer to the discussion of FIG. 1B.

Any of data processing systems 104 may be an edge device or other types of computing devices. To reduce unauthorized access to such devices, data processing systems 104 may be configured to limit network connectivity. For example, data processing systems 104 may utilize whitelists, blacklists, and/or other communication screening mechanisms to limit communication with other devices. Such communications maybe limited to a limited number of entities that may include management entities such as device management system 102. Consequently, when device management system 102 obtains new network information (e.g., due to change in network connections), it may be more challenging to establish secure communications with data processing systems 104.

When providing the computer-implemented services, a managed device (e.g., data processing systems 104) may rely on the management controller to facilitate communications with any number of other data processing systems, servers, etc. To facilitate transmission of data, the management controller may (i) receive, via out-of-band communication channel, a request indicating performance of an action set by the managed device, (ii) attempt, based on the request and using at least a sideband channel between the management controller and the hardware resources of the managed device, to perform the action set, (iii) notify, via the out-of-band communication channel and based at least in part on the attempt to perform the action set, a cloud server (e.g., cloud server 100) of at least an outcome of the attempt to perform the action set.

To provide management services for a managed device (e.g., any of data processing systems 104), cloud server 100 may verify authority of remote entities (e.g., device management systems) to manage data processing systems 104 and provide a bridge for communications between authorized remote entities and data processing systems 104. To provide the management services, cloud server 100 may, for example, (i) obtain requests from device management system 102 indicating performance of action sets by data processing systems 104, (ii) perform authorization process on the request to determine whether device management system 102 is authorized to manage data processing systems 104, (iii) based on the determination that device management system 102 is an authorized device, identify out-of-band components of data processing systems 104, (iv) forward, to the out-of-band components and via an out-of-band communication channel, the request, (v) receive, from the out-of-band components and via the out-of-band communication and responsive to the forwarded request, a notification based at least in part on an attempt to perform the action set, (vi) provide, to device management system, the notification to complete servicing of the request, and/or (vii) may include other operations.

By doing so, cloud server 100 may facilitate secure communications between device management system 102 and data processing systems 104 to allow performance of action sets by data processing systems 104.

Device management system 102 may, in addition to other services, may cooperate in management services of data processing systems 104. To do so, device management system 102 may (i) provide identifying information (e.g., to identify device management system 102) to cloud server 100 to establish authority to manage data processing systems 104, (ii) provide request(s) to cloud server 100 that may indicate an action set to be performed by data processing systems 104, (iii) receive notifications from cloud server 100 regarding performance of the action set (e.g., in response to the request), and/or (iv) may include other operations.

Figure 2A:
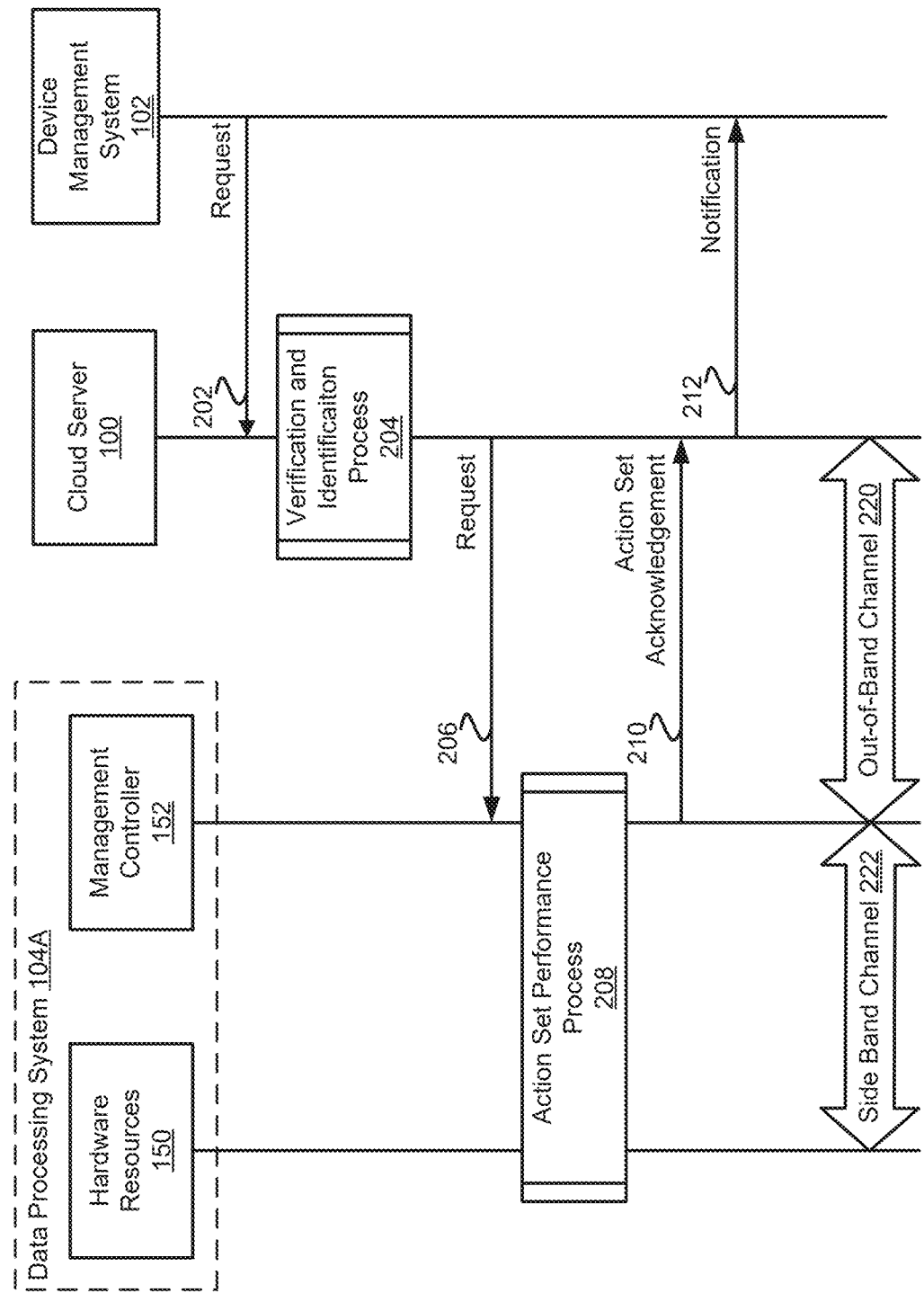

Refer to FIGS. 2A-2B for additional details regarding establishing authorization of devices to manage data processing systems and performing management services for data processing systems.

Figure 3:
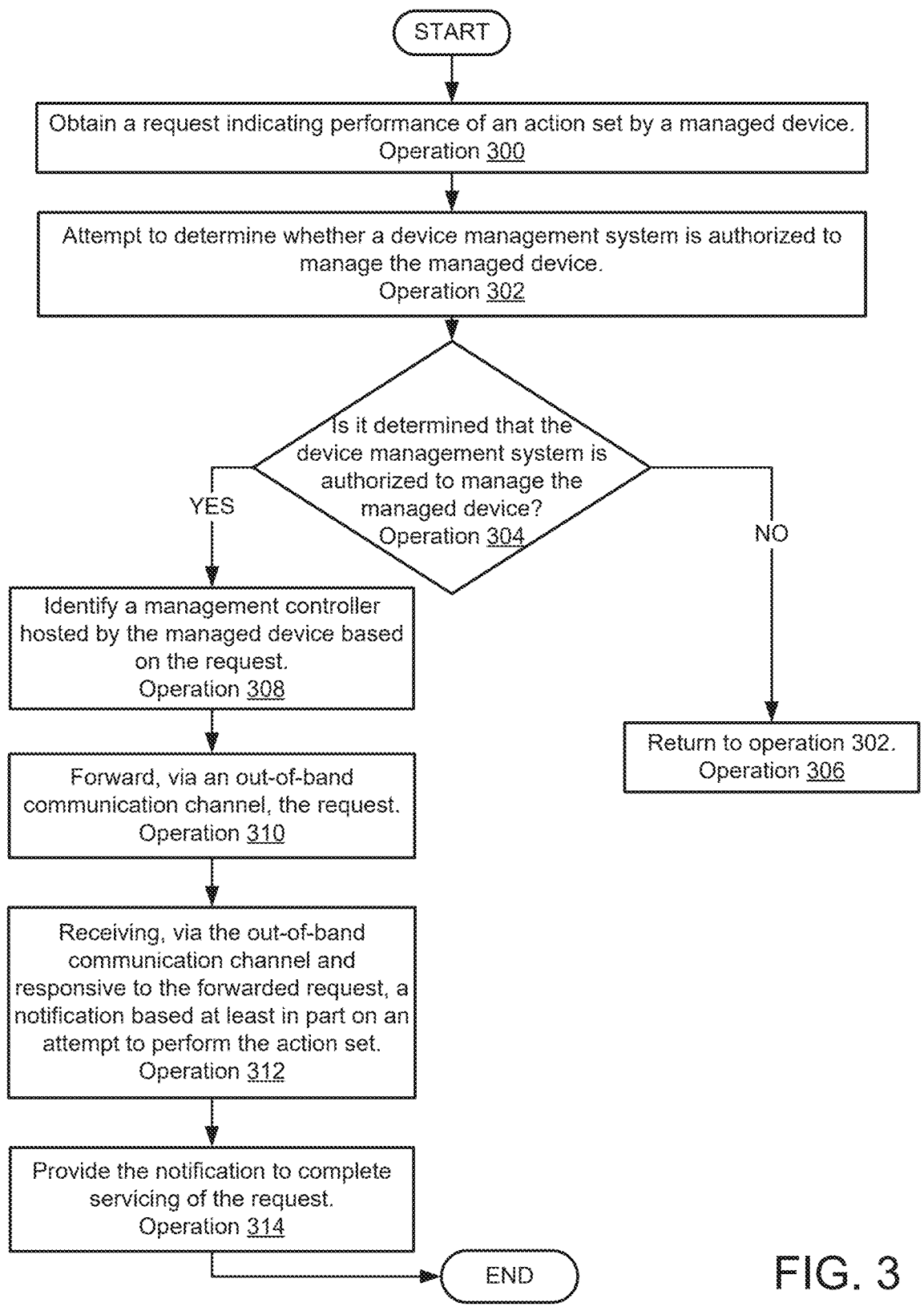
FIG. 3 shows a flow diagram illustrating a method of managing operations of a data processing system in accordance with an embodiment.

When providing their functionality, any of cloud server 100, device management system 102, and data processing systems 104 may perform all, or a portion, of the processes, interactions, and methods illustrated in FIGS. 2A-3.

Any of data processing systems 104, and device management system 102 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), and edge device, an embedded system, local controllers, an edge node, and/or any other type of data processing device or system. For additional details regarding computing devices, refer to FIG. 4.

Any of the components illustrated in FIG. 1A may be operably connected to each other (and/or components not illustrated) with communication system 106.

Communication system 106 may include one or more networks that facilitate communication between any number of components. The networks may include wired networks and/or wireless networks (e.g., and/or the Internet). The networks may operate in accordance with any number and types of communication protocols (e.g., such as the internet protocol).

Communication system 106 may be implemented with one or more local communications links (e.g., a bus interconnecting a processor of any of data processing systems 104 and device management system 102).

While illustrated in FIG. 1A as including a limited number of specific components, a system in accordance with an embodiment may include fewer, additional, and/or different components than those illustrated therein.

Refer to FIG. 1B for additional details regarding the management controller, network module, out-of-band communication channel, and/or hardware resources of data processing systems 104.

Turning to FIG. 1B, a diagram illustrating data processing system 104A in accordance with an embodiment is shown. Data processing system 104A may be similar to any of data processing systems 104 shown in FIG. 1A.

To provide computer-implemented services, data processing system 104A may include any quantity of hardware resources 150. Hardware resources 150 may be in-band hardware components, and may include a processor operably coupled to memory, storage, and/or other hardware components.

The processor may host various management entities such as operating systems, drivers, network stacks, and/or other software entities that provide various management functionalities. For example, the operating system and drivers may provide abstracted access to various hardware resources. Likewise, the network stack may facilitate packaging, transmission, routing, and/or other functions with respect to exchanging data with other devices.

For example, the network stack may support transmission control protocol/internet protocol communication (TCP/IP) (e.g., the Internet protocol suite) thereby allowing hardware resources 150 to communicate with other devices via packet switched networks and/or other types of communication networks.

The processor may also host various applications that provide the computer-implemented services. The applications may utilize various services provided by the management entities and use (at least indirectly) the network stack to communicate with other entities.

However, use of the network stack and the services provided by the management entities may place the applications at risk of indirect compromise. For example, if any of these entities trusted by the applications are compromised, these entities may subsequently compromise the operation of the applications. For example, if various drivers and/or the communication stack are compromised, communications to/from other devices may be compromised. If the applications trust these communications, then the applications may also be compromised.

For example, to communicate with other entities, an application may generate and send communications to a network stack and/or driver, which may subsequently transmit a packaged form of the communication via channel 170 to a communication component, which may then send the packaged communication (in a yet further packaged form, in some embodiments, with various layers of encapsulation being added depending on the network environment outside of data processing system 104A) to another device via any number of intermediate networks (e.g., via wired/wireless channels 176 that are part of the networks).

In addition, different configurations of hardware resources 150 and/or software resources may be implemented by data processing system 104A based on the type of computer-implemented services that are to be provided. Modifications to configurations of hardware resources 150 and/or the software resources may lead to downtime for data processing system 104A and may consume network bandwidth of channel 170.

To reduce the downtime of data processing system 104A and to reduce the likelihood of the applications and/or other in-band entities from being indirectly compromised, data processing system 104A may include management controller 152 and network module 160. Each of these components of data processing system 104A is discussed below.

Management controller 152 may be implemented, for example, using a system on a chip or other type of independently operating computing device (e.g., independent from the in-band components, such as hardware resources 150, of a host data processing system 104A). Management controller 152 may provide various management functionalities for data processing system 104A. For example, management controller 152 may monitor various ongoing processes performed by the in-band component, may manage power distribution, thermal management, and/or other functions of data processing system 104A.

To do so, management controller 152 may be operably connected to various components via side band channels 174 (in FIG. 1B, a limited number of side band channels are included for illustrative purposes, it will be appreciated that management controller 152 may communication with other components via any number of side band channels). The side band channels may be implemented using separate physical channels, and/or with a logical channel overlay over existing physical channels (e.g., logical division of in-band channels). The side band channels may allow management controller 152 to interface with other components and implement various management functionalities such as, for example, general data retrieval (e.g., to snoop ongoing processes), telemetry data retrieval (e.g., to identify a health condition/other state of another component), function activation (e.g., sending instructions that cause the receiving component to perform various actions such as displaying data, adding data to memory, causing various processes to be performed), and/or other types of management functionalities.

For example, to reduce the likelihood of indirect compromise of an application hosted by hardware resources 150, management controller 152 may enable information from other devices to be provided to the application without traversing the network stack and/or management entities of hardware resources 150. To do so, the other devices may direct communications including the information to management controller 152. Management controller 152 may then, for example, send the information via side band channels 174 to hardware resources 150 (e.g., to store it in a memory location accessible by the application, such as a shared memory location, a mailbox architecture, or other type of memory-based communication system) to provide it to the application. Thus, the application may receive and act on the information without the information passing through potentially compromised entities. Consequently, the information may be less likely to also be compromised, thereby reducing the possibility of the application becoming indirectly compromised. Similar processes may be used to facilitate outbound communications from the applications.

Management controller 152 may be operably connected to communication components of data processing system 104A via separate channels (e.g., 172) from the in-band components, and may implement or otherwise utilize a distinct and independent network stack (e.g., TCP/IP). Consequently, management controller 152 may communicate with other devices independently of any of the in-band components (e.g., does not rely on any hosted software, hardware components, etc.). Accordingly, compromise of any of hardware resources 150 and hosted component may not result in indirect compromise of any management controller 152, and entities hosted by management controller 152.

To facilitate communication with other devices, data processing system 104A may include network module 160. Network module 160 may provide communication services for in-band components and out-of-band components (e.g., management controller 152) of data processing system. Specifically, an out-of-band communication channel (e.g., 172) that services management controller 152 and an in-band communication channel (e.g., 170) that services hardware resources 150 may run through network module 160. Network module 160 may host a TCP/IP stack to facilitate network communications via the out-of-band communication channel. To do so, network module 160 may include traffic manager 162 and interfaces 164.

Traffic manager 162 may include functionality to (i) discriminate traffic directed to various network endpoints advertised by data processing system 104A, and (ii) forward the traffic to/from the entities associated with the different network endpoints. For example, to facilitate communications with other devices, network module 160 may advertise different network endpoints (e.g., different media access control address/internet protocol addresses) for the in-band components and out-of-band components. Thus, other entities may address communications to these different network endpoints. When such communications are received by network module 160, traffic manager 162 may discriminate and direct the communications accordingly (e.g., over channel 170 or channel 172, in the example shown in FIG. 1B, it will be appreciated that network module 160 may discriminate traffic directed to any number of data units and direct it accordingly over any number of channels).

Accordingly, traffic directed to management controller 152 may never flow through any of the in-band components. Likewise, outbound traffic from the out-of-band component may never flow through the in-band components.

Specifically, network module 160 may separately advertise network endpoints for management controller 152 and hardware resources 150. The network endpoints may be usable by entities throughout a domain to which data processing system 104A is onboarded to address communications to hardware resources 150 using the in-band communication channel (e.g., 170) and management controller 152 using the out-of-band communication channel (e.g., 172).

To provide its functionality, management controller 152 may: (i) obtain, via an out-of-band communication channel (e.g., 172), a request, (ii) attempt, based on the request and using at least a sideband channel (e.g., 174) between management controller 152 and hardware resources 150, to perform the action set, (v) notify, via an out-of-band communication channel (e.g., 172) and based at least in part on the attempt to perform the action set, cloud server 100 of at least an outcome of the attempt to perform the action set, and/or (vi) perform other actions.

To support inbound and outbound traffic, network module 160 may include any number of interfaces 164. Interfaces 164 may be implemented using any number and type of communication devices which may each provide wired and/or wireless communication functionality. For example, interfaces 164 may include a wide area network card, a WiFi card, a wireless local area network card, a wired local area network card, an optical communication card, a radio access network (RAN) card, a wide area network (WAN) card, and/or other types of communication components. These components may support any number of wired/wireless channels 176.

Thus, from the perspective of an external device, the in-band components and out-of-band components of data processing system 104A may appear to be two independent network entities, that may independently addressable, and otherwise unrelated to one another.

To facilitate management of data processing system 104A over time, hardware resources 150, management controller 152 and/or network module 160 may be positioned in separately controllable power domains. By being positioned in these separate power domains, different subsets of these components may remain powered while other subsets are unpowered.

For example, management controller 152 and network module 160 may remain powered while hardware resources 150 is unpowered. Consequently, management controller 152 may remain able to communication with other devices even while hardware resources 150 are inactive. Similarly, management controller 152 may perform various actions while hardware resources 150 are not powered and/or are otherwise inoperable, unable to cooperatively perform various process, are compromised, and/or are unavailable for other reasons.

To implement the separate power domains, data processing system 104A may include a power source (e.g., 180) that separately supplies power to power rails (e.g., 184, 186) that power the respective power domains. Power from the power source (e.g., a power supply, battery, etc.) may be selectively provided to the separate power rails to selectively power the different power domains. A power manager (e.g., 182) may manage power from power source 180 is supplied to the power rails. Management controller 152 may cooperate with power manager 182 to manage supply of power to these power domains.

In FIG. 1B, an example implementation of separate power domains using power rails 184-186 is shown. The power rails may be implemented using, for example, bus bars or other types of transmission elements capable of distributing electrical power. While not shown, it will be appreciated that the power domains may include various power management components (e.g., fuses, switches, etc.) to facilitate selective distribution of power within the power domains.

When providing its functionality, components of data processing system 104A may perform all, or a portion, of the methods and operations illustrated in FIGS. 2A-3.

While illustrated in FIG. 1B with a limited number of specific components, a system may include additional, fewer, and/or different components without departing from embodiments disclosed herein.

As discussed above, the components of FIGS. 1A-1B may perform various methods to manage operation of a data processing system. FIGS. 2A-3 may illustrate examples of methods that may be performed by the components of FIGS. 1A-1B. For example, a management controller similar to management controller 152 may perform all or a portion of the methods. In the diagrams discussed below and shown in FIGS. 2A-3, any of the operations may be repeated, performed in different orders, and/or performed in parallel with or in a partially overlapping in time manner with other operations.

To further clarify embodiments disclosed herein, interactions diagrams in accordance with an embodiment are shown in FIGS. 2A-2B. These interactions diagrams may illustrate how data may be obtained and used within the system of FIGS. 1A-1B.

In the interaction diagrams, processes performed by and interactions between components of a system in accordance with an embodiment are shown. In the diagrams, components of the system are illustrated using a first set of shapes (e.g., hardware resources 150, management controller 152, etc.), located towards the top of each figure. Lines descend from these shapes. Processes performed by the components of the system are illustrated using a second set of shapes (e.g., verification and identification process 204, etc.) superimposed over these lines. Interactions (e.g., communication, data transmissions, etc.) between the components of the system are illustrated using a third set of shapes (e.g., 210, 212, etc.) that extend between the lines. The third set of shapes may include lines terminating in one or two arrows. Lines terminating in a single arrow may indicate that one way interactions (e.g., data transmission from a first component to a second component) occur, while lines terminating in two arrows may indicate that multi-way interactions (e.g., data transmission between two components) occur.

Generally, the processes and interactions are temporally ordered in an example order, with time increasing from the top to the bottom of each page. For example, the interaction labeled as 210 may occur prior to the interaction labeled as 212. However, it will be appreciated that the processes and interactions may be performed in different orders, any may be omitted, and other processes or interactions may be performed without departing from embodiments disclosed herein.

Turning to FIG. 2A, a first interaction diagram in accordance with an embodiment is shown. The first interaction diagram may illustrate example processes and interactions that may occur during a management workflow which may be performed to allow authorized device management systems to manage operations of a managed device (e.g., data processing system 104A).

To perform the management workflow, at interaction 202, a request may be provided to cloud server 100 by device management system 102. For example, the request may be generated and provided to cloud server 100 via (i) transmission via a message, (ii) storing in a storage with subsequent retrieval by cloud server 100, (iii) via a publish-subscribe system where cloud server 100 subscribed to updates from device management system 102 thereby causing a copy of the request to be propagated to cloud server 100, and/or via other processes. By providing the request to cloud server 100, cloud server 100 may receive a copy of the request and perform authorization services.

For example, the request may include: (i) an identifier of device management system 102, (ii) a message indicating an action set to be performed by a managed device (e.g., data processing system 104A), (iii) identifier for hardware resources 150 of the managed device, and/or (iv) any other information.

In response to receiving the request, cloud server 100 may perform verification and identification process 204. During verification and identification process 204, cloud server 100 may attempt to determine whether device management system 102 is authorized to manage the managed device (e.g., data processing system 104A). For example, cloud server 100 may utilize the identifier of device management system (e.g., provided by the request) to perform a comparison process using a databased of authorized devices and the associated managed devices (e.g., data processing systems 104A-104N) in which authority has been given to manage operation of the authorized managed devices. Refer to FIG. 2B for additional information regarding registration and authorization of managed devices.

Once authorization of the request is verified, cloud server 100 may, as a part of verification and identification process 204, identify the management controller associated with the managed device in which the request is directed to. To do so, cloud server 100 may utilize an identifier of hardware resources 150 (e.g., obtained from the request) as a key in performing a look up to obtain an identifier for management controller 152. For example, cloud server 100 may perform a look up process where the identifiers of management controllers of different managed devices (e.g., any of data processing systems 104A-104N) are stored in a searchable format keyed to identifiers of hardware resources of the different managed devices.

Once the identity of management controller 152 is obtained, at interaction 206, cloud server 100 may generate a request and provide the request to management controller 152 via out-of-band channel 220. The request may be provided via (i) transmission via a message, (ii) storing in a storage with subsequent retrieval by management controller 152, (iii) via a publish-subscribe system where management controller 152 subscribes to updates from cloud server 100 thereby causing a copy of the request to be propagated to management controller 152, and/or via other processes. By providing the request to management controller 152, management controller 152 may receive a copy of the request.

Once received, management controller 152 may utilize the request to cooperatively perform action set performance process 208. During action set performance process 208, management controller 152 may attempt to perform the action set specified by the request including utilizing hardware resources 150 to do so. For example, management controller 152 may: (i) read the request received from cloud server 100, (ii) identify an action set to be performed, (iii) attempt to perform the identified action set by using at least a side band channel (e.g., 222) to communicate instructions from management controller 152 to hardware resources 150, and/or (iv) by other methods.

Following action set performance process 208, at interaction 210, an action set acknowledgement may be provided to cloud server 100 by management controller 152 via out-of-band channel 220. The action set acknowledgement may be provided via (i) transmission via a message, (ii) storing in a storage with subsequent retrieval by cloud server 100, (iii) via a publish-subscribe system where cloud server 100 subscribes to updates from management controller 152 thereby causing a copy of the action set acknowledgement to be propagated to cloud server 100, and/or via other processes.

In response to receiving the action set acknowledgement, at interaction 212, cloud server 100 may utilize the action set acknowledgment to send a notification to device management system 102. The notification may include a payload indicating an outcome from the attempt to perform the action set by the managed device (e.g., data processing system 104A). Once generated, the notification may be sent to device management system via a predetermined manner (e.g., such as via a particular port, via a particular communication protocol, etc. and that complies with the communication restrictions enforced by data processing system 104A).

By providing the notification to device management system 102, device management system 102 may receive the status and/or outcome of the request to perform an action set by the managed device.

Thus, as shown in the example of FIG. 2A, a cloud server may provide a bridge for communications between a managed device and an authorized device management system by forwarding requests indicating an action set to be performed by the managed device after verifying the authority of device management system to manage the managed device.

In order to verify authorization of device management system 102 to manage data processing system 104A, cloud server 100 may perform a registration process to establish authority to manage operation of data processing system 104A.

Turning to FIG. 2B, a first interaction diagram in accordance with an embodiment is shown. The first interaction diagram may illustrate example processes and interactions that may occur during registration of device management system to establish authority to manage data processing systems.

To perform registration of device management system, at interaction 230, device identification for device management system 102 may be provided to cloud server 100. The device information may be provided via (i) transmission via a message, (ii) storing in a storage with subsequent retrieval by cloud server 100, (iii) via a publish-subscribe system where cloud server 100 subscribes to updates from device management system 102 thereby causing a copy of the device identification to be propagated to cloud server 100, and/or via other processes.

By providing the device identification to cloud server 100, cloud server may identify device management system 102 and initiate a registration process to establish authority to manage operation of a managed device (e.g., data processing system 104A).

In response to receiving the device identification, cloud server 100 may perform registration process 232. During registration process 232, cloud server may cooperatively attempt to register device management system 102 with respect to authority over the managed device (e.g., data processing system 104A). However, cloud server 100 may not assign authority over data processing system 104A to device management system 102 until at least one additional factor to authenticate the authorization to manage operations of data processing system 104A is obtained. For example, cloud server 100 may refuse to provide device management system 102 authority to manage operation of data processing system 104A until data processing system 104A and/or another trusted device provides confirmation of authority to cloud server 100.

For example, at interaction 234, an authorization request may be provided to management controller 152 by cloud server 100. The authorization request may include: (i) the device information for device management system, (ii) a prompt for a user of data processing system 104A to authorize management of data processing system 104A by device management system, and/or (iii) any other information necessary to perform an authorization process.

In response to receiving the authorization request, management controller 152 may cooperatively perform authorization process 236 to determine whether to give authority to manage operation of data processing system 104A to device management system 102. During authorization process 236, management controller 152 may active various programs hosted by hardware resources 150 of data processing system 104A to obtain approval or denial of the authorization request. For example, management controller 152 may communicate instructions to hardware resources 150 via side band channel 222 to provide a prompt (e.g., via interactive display) to a user of data processing system 104A by which a user may decide to agree or disagree to the authorization request.

If the authorization request is verified, management controller 152 may provide an authorization response 238 to cloud server 100 from management controller 152 via out-of-band channel 220. The authorization response may include: (i) input indicating approval or denial of the authorization request, (ii) identifiers for management controller 152 (e.g., unique identifiers, serial numbers, etc.) usable to identify the management controller associated with the hardware resources of data processing system 104A, and/or (iii) any other information necessary to facilitate the authorization process. By doing so, cloud server 100 may determine whether authority to manage operations of data processing system 104A by device management system 102 is authorized.

Any of the processes illustrated using the second set of shapes and interactions illustrated using the third set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes and interactions illustrated using the third set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the processes and interactions may be implemented using any type and number of data structures. The data structures may be implemented using, for example, tables, lists, linked lists, unstructured data, data bases, and/or other types of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

Thus, via processes and interactions shown in FIGS. 2A-2B, communication capabilities between devices may be reestablished after use of secrets previously used to facilitate the communication capabilities is no longer available even in limited communication environments such as edge systems that may rely on limited communication capabilities for security purposes.

Thus, via processes and interactions shown in FIGS. 2A-2B, secure communication capabilities between device management system and data processing systems may be established using a cloud server to bridge the communications to facilitate management of data processing systems even during limited functionality and/or limited communication capability of data processing systems.

As discussed above, the components of FIGS. 1A-2B may perform various methods to manage the operation of data processing systems. FIG. 3 illustrates methods that may be performed by the components of FIGS. 1A-2B. In the diagram discussed below and shown in FIG. 3, any of the operations may be repeated, performed in different orders, and/or performed in parallel with or in a partially overlapping in time manner with other operations.

Turning to FIG. 3, a first flow diagram illustrating a method of managing operations of a managed device by a cloud server in accordance with an embodiment is shown. The method may be performed by any of cloud server 100, data processing systems 104, device management system 102, and/or other entities without departing from embodiments disclosed herein.

Prior to operation 300, a cloud server may perform methods to establish a registry of devices (e.g., device management systems) with authority to manage operation of managed devices (e.g., data processing systems and/or components of data processing systems). Establishing a registry of devices authorized to manage data processing systems by the cloud server may include: (i) obtaining, by the cloud server and from the device management system, a request for authority to manage operation of the managed system, (ii) performing, by the cloud server and based on the request for authority, a registration process to attempt to register the device management system with respect to authority over the managed system, and/or performing other operations.

The request for authority to manage operation of the managed system may be obtained by: (i) receiving the request for authority from an external entity via electronic communication, (ii) reading the request for authority from storage, and/or (iii) performing other methods.

The registration process may be performed by: (i)

At operation 300, a request indicating performance of an action set by a managed device may be obtained. The request may be obtained by: (i) receiving the request from an external entity via electronic communication, (ii) reading the request from storage, and/or (iii) by any other methods.

At operation 302, an attempt to determine whether a device management system is authorized to manage the managed device. The attempt to determine whether the device management system is authorized to manage the managed device may be facilitated by: (i)

At operation 304, based on the attempt to determine whether the device management system is authorized to manage the managed device, If it is determined that the device management system is authorized to manage the managed device (e.g., the determination is "Yes" at operation 304), then the method may proceed to operation 308.

At operation 308, a management controller may be identified. The management controller may be hosted by the managed device based on the request. The management controller may be identified by: (i) obtaining an identifier of hardware resources of the managed device based on the request, (ii) performing a look up using the identifier of hardware resources as a key to obtain an identifier for the management controller, and/or (iii) by any other methods. For example, cloud server 100 may utilize an identifier of hardware resources 150 to perform a look up using a databased of identifiers of management controllers of different managed devices are stored in a searchable format keyed to identifiers of hardware resources of the different managed devices.

At operation 310, the request may be forwarded to the management controller and via an out-of-band communication channel. The request may be forwarded by: (i) providing, via the out-of-band communication channel, the request to the management controller from the cloud server, (ii) reading the request from storage, and/or (iii) other methods.

At operation 312, a notification may be received by the cloud server and to the management controller via an out-of-band communication channel. The notification may be received in response to the forwarded request. The notification may be received by: (i) receiving, via the out-of-band communication channel, the notification by the management controller from the cloud server, (ii) reading the notification from storage, and/or (iii) other methods.

At operation 314, the notification may be provided to the device management system by the cloud server to complete servicing the request. The notification may be provided by: (i) providing the notification to the device management system via electronic communication, (ii) reading the notification from storage, and/or (iii) other methods.

The method may end following operation 314.

Managing operations of a managed device by a cloud server may also include: (i) receiving, by the management controller and via the out-of-band communication channel, the request, (ii) attempting, by the management controller and hardware resources of the managed device, to perform the action set, (iii) notifying, by the management controller and via the out-of-band communication channel and based at least in part on the attempting to perform the action set, the cloud server of at least an outcome of the attempting to perform the action set, and/or (iv) any other operations.

Figure 4:
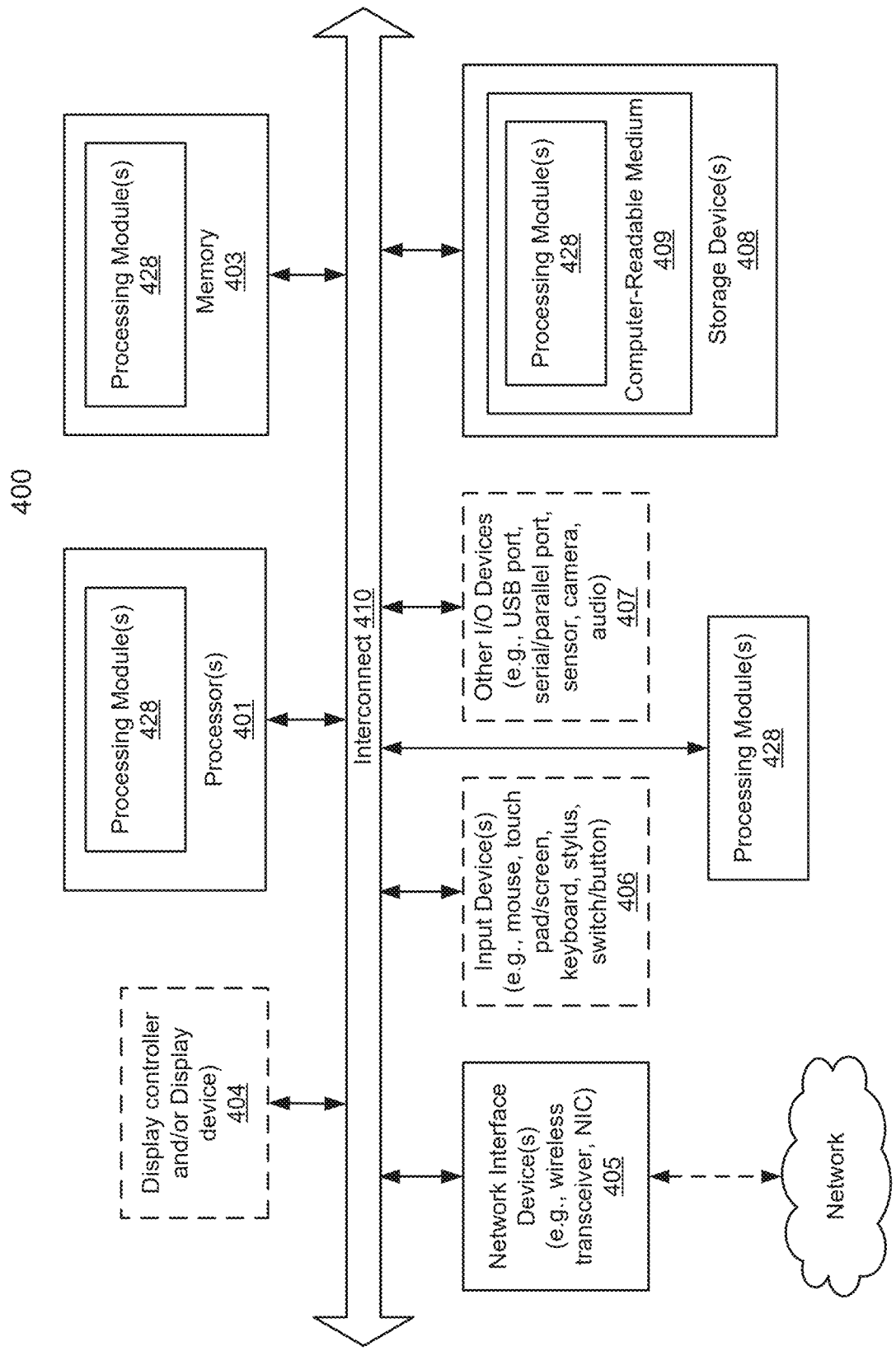
FIG. 4 shows a block diagram illustrating a data processing system in accordance with an embodiment.

Any of the components illustrated in FIGS. 1A-2B may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random-access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a Wi-Fi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs, or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing operation of a managed device by a cloud server, the method comprising:
    obtaining, from a device management system attempting to manage the managed device and by the cloud server, a request indicating performance of an action set by the managed device;
    determining, by the cloud server and based on the request, whether the device management system is authorized to manage the managed device;
    in a first instance of the determination where the device management system is determined as being authorized to manage the managed device:
        identifying, by the cloud server, a management controller hosted within the managed device based on the request obtained from the device management system;
        forwarding, by the cloud server and to the management controller and via an out-of-band communication channel, the request for the management controller to approve or deny the request;
        receiving, by the cloud server and from the management controller and via the out-of-band communication channel and responsive to the request forwarded to the management controller, a notification based at least in part on an attempt to perform the action set; and providing, by the cloud server and to the device management system, the notification to complete servicing of the request obtained from the device management system.

2. The method of claim 1, wherein identifying the management controller comprises:
obtaining an identifier of hardware resources of the managed device based on the request; and
performing a look up using the identifier of the hardware resources as a key to obtain an identifier for the management controller,
wherein identifiers of management controllers of different managed devices are stored in a searchable format keyed to identifiers of hardware resources of the different managed devices.

3. The method of claim 1, wherein the device management system is unable to communicate with the managed device, and the device management system relies on the cloud server to bridge communications to the managed device.

4. The method of claim 3, wherein during communication between the device management system and the managed device, the communication is encrypted in a manner that prevents the cloud server from accessing the communication.

5. The method of claim 1, further comprising:
prior to obtaining the request:
obtaining, by the cloud server and from the device management system, a request for authority to manage operation of the managed device; and
performing, by the cloud server and based on the request for the authority, a registration process to attempt to register the device management system with respect to authority over the managed device.

6. The method of claim 1, further comprising:
receiving, by the management controller and via the out-of-band communication channel, the request;
attempting, by the management controller and based on the request and using at least a sideband channel between the management controller and hardware resources of the managed device, to perform the action set; and
notifying, by the management controller and via the out-of-band communication channel and based at least in part on the attempting to perform the action set, the cloud server of at least an outcome of the attempting to perform the action set.

7. The method of claim 1, wherein the managed device comprises hardware resources and a network module adapted to separately advertise network endpoints for the management controller and the hardware resources of the managed device, the network endpoints being usable by the cloud server to address communications to the hardware resources using an in-band communication channel and the management controller using the out-of-band communication channel.

8. The method of claim 7, wherein the request is addressed to a network endpoint of the network endpoints associated with the hardware resources via the network endpoint associated with the hardware resources.

9. The method of claim 7, wherein the management controller and the network module are on separate power domains from the hardware resources so that the management controller and the network module are operable while the hardware resources are inoperable.

10. The method of claim 7, wherein the out-of-band communication channel runs through the network module, and an in-band communication channel that services the hardware resources also runs through the network module.

11. The method of claim 7, wherein the network module hosts a transmission control protocol/internet protocol (TCP/IP) stack to facilitate network communications via the out-of-band communication channel.

12. A non-transitory machine-readable medium having instructions stored therein, which when executed by a processor of a cloud server, cause the processor to perform operations for managing operations of a managed device by the cloud server, the operations comprising:
obtaining, from a device management system attempting to manage the managed device and by the cloud server, a request indicating performance of an action set by the managed device;
determining, by the cloud server and based on the request, whether the device management system is authorized to manage the managed device;
in a first instance of the determination where the device management system is determined as being authorized to manage the managed device:
identifying, by the cloud server, a management controller hosted within the managed device based on the request obtained from the device management system;
forwarding, by the cloud server and to the management controller and via an out-of-band communication channel, the request for the request to be processed by the management controller;
receiving, by the cloud server and from the management controller and via the out-of-band communication channel and responsive to the request forwarded to the management controller, a notification based at least in part on an attempt to perform the action set; and
providing, by the cloud server and to the device management system, the notification to complete servicing of the request obtained from the device management system.

13. The non-transitory machine-readable medium of claim 12, wherein identifying the management controller comprises:
obtaining an identifier of hardware resources of the managed device based on the request; and
performing a look up using the identifier of the hardware resources as a key to obtain an identifier for the management controller,
wherein identifiers of management controllers of different managed devices are stored in a searchable format keyed to identifiers of hardware resources of the different managed devices.

14. The non-transitory machine-readable medium of claim 12, wherein the device management system is unable to communicate with the managed device, and the device management system relies on the cloud server to bridge communications to the managed device.

15. The non-transitory machine-readable medium of claim 14, wherein during communication between the device management system and the managed device, the communication is encrypted in a manner that prevents the cloud server from accessing the communication.

16. The non-transitory machine-readable medium of claim 12, wherein the operations further comprise:
prior to obtaining the request:
obtaining, by the cloud server and from the device management system, a request for authority to manage operation of the managed device; and performing, by the cloud server and based on the request for the authority, a registration process to attempt to register the device management system with respect to authority over the managed device.

17. A data processing system configured as a cloud server, comprising:
a processor; and
a memory coupled to the processor to store instructions, which when executed by the processor, cause the processor to perform operations for managing operations of a managed device by the cloud server, the operations comprising:
  obtaining, from a device management system attempting to manage the managed device and by the cloud server, a request indicating performance of an action set by the managed device;
  determining, by the cloud server and based on the request, whether the device management system is authorized to manage the managed device;
  in a first instance of the determination where the device management system is determined as being authorized to manage the managed device:
    identifying, by the cloud server, a management controller hosted within the managed device based on the request obtained from the device management system;
    forwarding, by the cloud server and to the management controller and via an out-of-band communication channel, the request for the request to be processed by the management controller;
    receiving, by the cloud server and from the management controller and via the out-of-band communication channel and responsive to the request forwarded to the management controller, a notification based at least in part on an attempt to perform the action set; and
    providing, by the cloud server and to the device management system, the notification to complete servicing of the request obtained from the device management system.

18. The data processing system of claim 17, wherein identifying the management controller comprises:
  obtaining an identifier of hardware resources of the managed device based on the request; and
  performing a look up using the identifier of the hardware resources as a key to obtain an identifier for the management controller,
  wherein identifiers of management controllers of different managed devices are stored in a searchable format keyed to identifiers of hardware resources of the different managed devices.

19. The data processing system of claim 17, wherein the device management system is unable to communicate with the managed device, and the device management system relies on the cloud server to bridge communications to the managed device.

20. The data processing system of claim 19, wherein during communication between the device management system and the managed device, the communication is encrypted in a manner that prevents the cloud server from accessing the communication.

* * * * *